Patented Nov. 26, 1940

2,222,592

UNITED STATES PATENT OFFICE 2,222,592

PURIFICATION OF COPPER

Frank J. Dobrovolny, Ransomville, N. Y., assignor to E. I. du Pont de Nemours & Company, Wilmington, Del., a corporation of Delaware No Drawing. Application August 16, 1939, Serial No. 290,519

5 Claims. (Cl. 75—76)

This invention relates to the purification of copper and more particularly to the treatment of molten copper with cyanides for purification purposes.

For certain specialized uses it is necessary to employ highly purified copper. Thus, it is known that for copper to possess high electrical conductivity it must be completely deoxidized and be free from inclusions or occlusions of oxides or gases.

Various methods have been proposed for purifying copper, which methods include that of treating molten copper with a metal cyanide, e. g. by stirring molten copper with the cyanide, prior to casting the metal. (See British Patent 1759 of 1877 and U. S. Patent 1,971,149.) While it has been recognized that cyanides are effective purifying agents for this purpose, so far as I am aware, the previously suggested purification methods involving the use of cyanides have found little or no commercial application, apparently because no satisfactory method for effecting this treatment was known.

It is an object of my invention to provide an improved process of purifying copper by means of cyanogen compounds whereby the known high temperature purifying action of such compounds may find practical and valuable application in large scale purification operations.

The above and other objects may be accomplished in accordance with the present invention by treating molten copper with a molten inorganic treating medium which contains dissolved therein a metal cyanogen compound. The treatment may be effected in any suitable manner, e. g. by stirring the molten metal with the molten inorganic treating medium containing for example a metal cyanide or cyanate; preferably the molten metal is poured into a molten treating medium. I have discovered that by operation in this manner the copper is rapidly and effectively distributed through the treating medium and settles to the bottom of the vessel and is then immediately ready for pouring or subsequent fabrication treatment.

Various fusible inorganic treating media are suitable for use in practicing the hereindescribed invention, so long as the metal cyanogen compound whose use is contemplated may be dissolved in said medium at the treating temperature, which may be any temperature ranging from slightly above the melting point of copper up to several hundred degrees, e. g. 300 to 400° C., above the melting point. Preferably, a molten siliceous treating medium is used and the best results are obtained with siliceous media having a relatively low viscosity at the treating temperature. Treating media having relatively simple compositions, e. g. soda-silica or soda-lime-silica compositions, which of course also contain dissolved therein a metal cyanogen compound, may be used, but compositions which contain, in addition to soda and silica other constituents, such as fluorspar, borax, alumina, alkaline earth metal oxides and the like, are preferred. The components of the treating medium should be chosen with the view of obtaining a composition having a low viscosity, which facilitates rapid and complete action of the cyanide with the impurities in the copper, and will not introduce hydrogen or other absorbable gases into the copper. Active oxidizers should be omitted.

Of the metal cyanogen compounds which may be used for the present purpose, the metal cyanides, e. g. the alkali and alkaline earth metal cyanides, are most effective and are preferred. The use of sodium cyanide, which compound is highly effective, is relatively cheap and readily available commercially, is especially recommended.

As illustrative of how the invention may be practiced, molten copper containing in the neighborhood of about 1% or less of impurities is poured into a molten inorganic treating medium containing dissolved therein a metal cyanogen compound, for example, sodium cyanide. The volume of the treating medium may, for example, be about 5 to 50% of the volume of the copper being treated, although a larger volume may be employed with good results. Naturally, the temperature of the medium should be above the melting point of the copper so as to maintain the latter in the molten state during the treatment. The amount of metal cyanide dissolved in the treating medium may be varied over a wide range, depending upon the extent of purification required. In general, a medium containing 0.2 to 20% will be found to give satisfactory results. Obviously, if the molten copper is poured into a relatively deep body of molten treating medium, the concentration of cyanide in the latter need not be as great as when a relatively shallow body of medium is used.

The density of the copper being greater than that of the inorganic medium, the former sinks to the bottom of the treating vessel and may be drawn off in the molten state to be cast in accordance with usual methods. The treating medium, on the other hand, forms a protective layer over the molten copper so as to prevent contact of the latter with oxidizing and/or furnace gases. Upon withdrawal of the treated copper from the bottom of the vessel, the remaining inorganic composition may be reconditioned for use in subsequent operations by adding thereto sufficient metal cyanide to maintain the desired cyanide concentration.

Instead of purifying the copper batchwise as described above, the process may be operated continuously by continuously withdrawing treated copper from the bottom of the treating vessel while continuously pouring untreated molten copper into the molten cyanide-containing medium in the upper part of the vessel. When operating in this manner, it will be necessary occasionally to add cyanide to the treating medium, either directly or by replacing, either continuously or intermittently, cyanide-impoverished medium with cyanide-enriched medium. Also, instead of pouring the molten copper into the treating body, contact of the latter with the molten copper may be effected by stirring it with the medium or the two may be flowed countercurrently to each other in a suitable treating vessel. In general, I prefer to pour the molten copper into a suitable body of molten inorganic treating medium containing dissolved metal cyanide.

One of the chief advantages of my improved method is that it permits the purification of a relatively large amount of copper with a small amount of cyanide in a relatively short time. Purification is rapidly effected, being substantially complete in the short time required for the molten metal to fall through the molten treating composition. The use of cyanide dissolved in a molten, low viscosity inorganic composition, for example a siliceous composition, facilitates control of the purifying action of the cyanide and effects a quick and thorough action of the cyanide upon the impurities contained in the copper being purified. Furthermore, it tends to decrease or avoid the deposition of free carbon in the molten copper and provides ideal conditions for the complete removal of inclusions of siliceous and/or other metal oxides from the molten copper. The molten treating medium acts as a protective covering for the copper during and after the treatment, in addition to its purifying action, and renders unnecessary after-treatment designed to degasify the treated molten copper.

In the specification and in the appended claims the term "siliceous treating composition" is used to designate a fusible inorganic composition containing silica in an amount ranging from 40 to 70% by weight thereof.

The foregoing description of my improved method of purifying copper is intended to be illustrative and not restrictive. Since various modifications of the invention will be apparent to those skilled in the art, it is to be understood that the invention is not limited to the above description thereof except as indicated by the appended claims.

I claim:

1. A method comprising contacting copper in the molten state with a molten siliceous treating composition containing dissolved therein a metal cyanogen compound.

2. A method comprising contacting copper in the molten state with a molten siliceous treating composition containing dissolved therein a metal cyanide.

3. A method comprising contacting copper in the molten state with a molten siliceous treating composition containing dissolved therein sodium cyanide.

4. A method comprising contacting copper in the molten state with a molten siliceous treating composition containing dissolved therein 0.2 to 20% of a metal cyanide.

5. A method comprising contacting copper in the molten state with a molten siliceous treating composition containing dissolved therein 0.2 to 20% of sodium cyanide.

FRANK J. DOBROVOLNY.